United States Patent
Cahn (10) Patent No.: US 11,315,353 B1
(45) Date of Patent: Apr. 26, 2022

(54) SYSTEMS AND METHODS FOR SPATIAL-AWARE INFORMATION EXTRACTION FROM ELECTRONIC SOURCE DOCUMENTS

(71) Applicant: INSTABASE, INC., San Francisco, CA (US)

(72) Inventor: Daniel Benjamin Cahn, New York, NY (US)

(73) Assignee: Instabase, Inc., San Francisco, CA (US)

( * ) Notice: Subject to any disclaimer, the term of this patent is extended or adjusted under 35 U.S.C. 154(b) by 0 days.

(21) Appl. No.: 17/344,490

(22) Filed: Jun. 10, 2021

(51) Int. Cl.
*G06F 16/93* (2019.01)
*G06T 7/11* (2017.01)
*G06V 30/148* (2022.01)
*G06V 30/416* (2022.01)

(52) U.S. Cl.
CPC ............ *G06V 30/416* (2022.01); *G06F 16/93* (2019.01); *G06T 7/11* (2017.01); *G06V 30/153* (2022.01)

(58) Field of Classification Search
CPC .... G06F 16/93; G06K 9/00469; G06K 9/344; G06T 7/11; G06V 30/153; G06V 30/416
See application file for complete search history.

(56) References Cited

U.S. PATENT DOCUMENTS

| | | | | |
|---|---|---|---|---|
| 5,848,184 | A * | 12/1998 | Taylor | G06K 9/00463 382/173 |
| 5,898,795 | A * | 4/1999 | Bessho | G06K 9/346 382/173 |
| 7,689,431 | B1 | 3/2010 | Carmel | |
| 7,720,318 | B1 | 5/2010 | Phinney | |
| 7,725,423 | B1 * | 5/2010 | Pricer | G06F 16/2477 |
| 8,254,681 | B1 * | 8/2012 | Poncin | G06F 40/20 382/180 |
| 9,275,030 | B1 * | 3/2016 | Fang | G06T 5/005 |
| 9,607,058 | B1 | 3/2017 | Gupta | |
| 2002/0064316 | A1 * | 5/2002 | Takaoka | G06K 9/00 382/305 |
| 2004/0181749 | A1 | 9/2004 | Chellapilla | |
| 2004/0223648 | A1 | 11/2004 | Hoene | |
| 2005/0289182 | A1 | 12/2005 | Pandian | |

(Continued)

OTHER PUBLICATIONS

Singh et al. ("A Proposed Approach for Character Recognition Using Document Analysis with OCR," Second International Conference on Intelligent Computing and Control Systems; Date of Conference: Jun. 14-15, 2018) (Year: 2018).*

(Continued)

*Primary Examiner* — Yubin Hung
(74) *Attorney, Agent, or Firm* — Esplin & Associates, PC (57) ABSTRACT

Systems and methods for spatial-aware information extraction from electronic source documents are disclosed. Exemplary implementations may: obtain an electronic source document in electronic format, including human-readable information; obtain extracted information that has been extracted from the electronic source document; generate a character-based representation of the electronic source document that uses a grid of character positions; and present a user interface to a user to search and/or select information in the electronic source document based on the character-based representation.

18 Claims, 6 Drawing Sheets

(56) References Cited

U.S. PATENT DOCUMENTS

| | | | |
|---|---|---|---|
| 2008/0148144 A1* | 6/2008 | Tatsumi | G06F 40/117 |
| | | | 715/235 |
| 2008/0212901 A1 | 9/2008 | Castiglia | |
| 2008/0291486 A1* | 11/2008 | Isles | G06Q 30/0236 |
| | | | 358/1.15 |
| 2009/0132590 A1* | 5/2009 | Huang | G06F 16/93 |
| 2012/0072859 A1 | 3/2012 | Wang | |
| 2012/0204103 A1 | 8/2012 | Stevens | |
| 2014/0200880 A1 | 7/2014 | Neustel | |
| 2015/0169951 A1 | 6/2015 | Khintsitskiy | |
| 2015/0169995 A1 | 6/2015 | Panferov | |
| 2016/0014299 A1* | 1/2016 | Saka | G06K 9/2054 |
| | | | 358/1.2 |
| 2016/0275526 A1 | 9/2016 | Becanovic | |
| 2018/0189592 A1* | 7/2018 | Annis | G06K 9/344 |
| 2018/0329890 A1* | 11/2018 | Ito | G06F 40/58 |
| 2020/0089946 A1* | 3/2020 | Mallick | G06K 9/00463 |
| 2020/0104359 A1 | 4/2020 | Patel | |
| 2020/0364343 A1* | 11/2020 | Atighetchi | G06F 8/427 |
| 2021/0258448 A1* | 8/2021 | Inoue | H04N 1/0449 |

OTHER PUBLICATIONS

Shafait ("Document image analysis with OCRopus," IEEE 13th International Multitopic Conference; Date of Conference: Dec. 14-15, 2009) (Year: 2009).*

Doermann et al., "Image Based Typographic Analysis of Documents", Proceedings of 2nd International Conference on Document Analysis and Recognition, pp. 769-773, 1993 IEEE. (Year: 1993).

Chaudhuri et al., "Extraction of type style-based meta-information from imaged documents", IJDAR (2001) 3: 138-149. (Year: 2001).

Slavin et al., "Matching Digital Documents Based on OCR", 2019 XXI International Conference Complex Systems: Control and Modeling Problems (CSCMP), pp. 177-181, published on Sep. 1, 2019. (Year: 2019).

* cited by examiner

| Name | Address | Price | Tax |
|---|---|---|---|
| John Smith | 123 W 45th Street New York, NY 12345 | $123.45 | Hello World |
| | | $234.56 | |
| | | $34.56 | Foo |
| | | $45.67 | |
| Jane Smith | 123 W 45th Street New York, NY 12345 | 01/01/1990 | $45.67 |
| | | | $456.78 |
| | | | $135.79 |
| The Doctor | 123 W 45th Street New York, NY 12345 | $43.21 | 01/01/1990 |
| | | $64.53 | |
| | | $98.65 | |
| | | Lorum | $53.46 |
| | | | $64.23 — 61 |
| Abraham Lincoln | 123 W 45th Street New York, NY 12345 | January 1, 2020 | |
| | | $5323.43 | $345.34 |
| | | Ipsum | |

↖ 60  *Fig. 6*

SYSTEMS AND METHODS FOR SPATIAL-AWARE INFORMATION EXTRACTION FROM ELECTRONIC SOURCE DOCUMENTS

FIELD OF THE DISCLOSURE

The present disclosure relates to systems and methods for spatial-aware information extraction from electronic source documents.

BACKGROUND

User interfaces for providing electronic documents are known. Recognizing alphanumerical characters in a photographed or scanned document is known, e.g., through optical character recognition (OCR).

SUMMARY

One aspect of the present disclosure relates to a system configured for spatial-aware information extraction from electronic source documents. The system may include one or more hardware processors configured by machine-readable instructions. The system may be configured to obtain an electronic source document in electronic format, including human-readable information. The system may be configured to obtain extracted information that has been extracted from the electronic source document. The system may be configured to generate a character-based representation of the electronic source document that uses a grid of character positions. The system may be configured to present a user interface to a user to search and/or select information in the electronic source document based on the character-based representation.

Another aspect of the present disclosure relates to a method for spatial-aware information extraction from electronic source documents. The method may include obtaining an electronic source document in electronic format, including human-readable information. The method may include obtaining extracted information that has been extracted from the electronic source document. The method may include generating a character-based representation of the electronic source document that uses a grid of character positions. The method may include presenting a user interface to a user to search and/or select information in the electronic source document based on the character-based representation.

As used herein, any association (or relation, or reflection, or indication, or correspondency) involving servers, processors, client computing platforms, documents, formats, presentations, extracted information, user interfaces, user interface elements, portions, fields, characters, character sequences, representations, grids, positions, coordinates, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
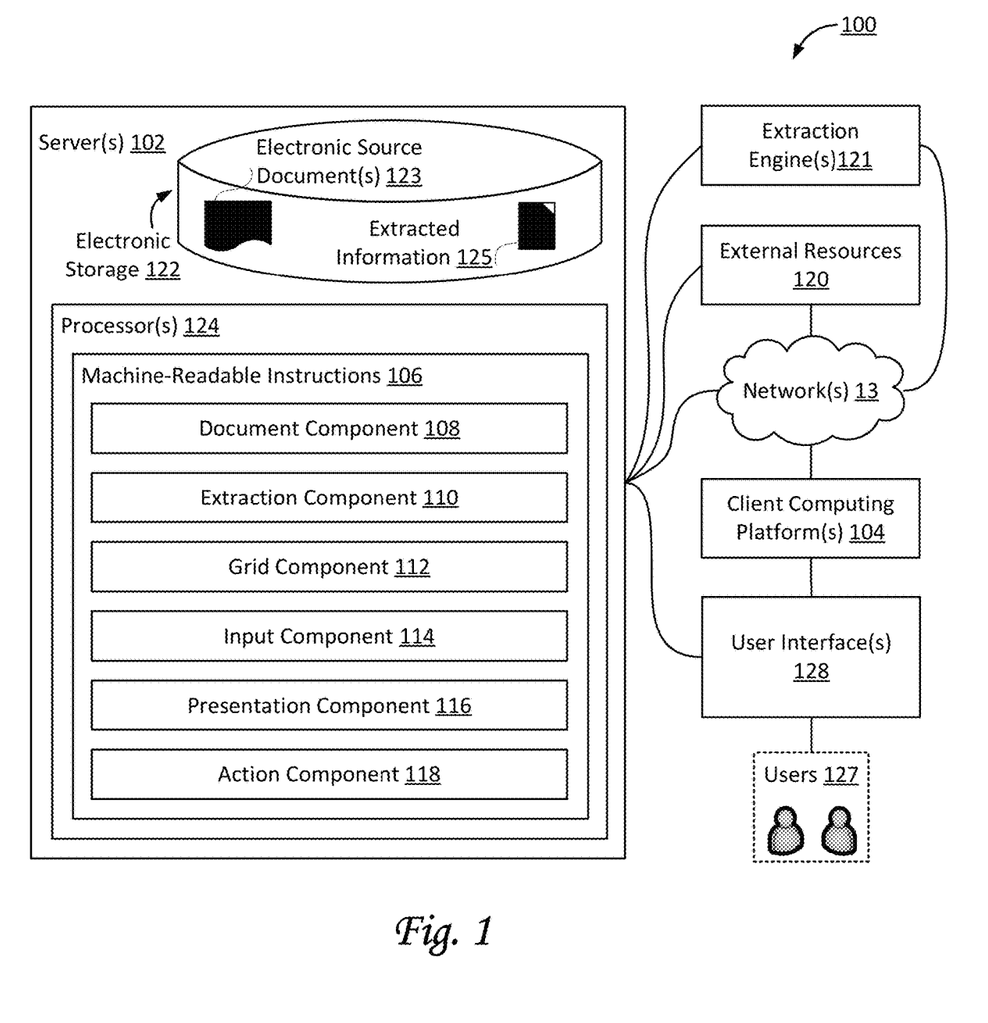
FIG. 1 illustrates a system configured for spatial-aware information extraction from electronic source documents, in accordance with one or more implementations.

FIG. 1 illustrates a system 100 configured for spatial-aware information extraction from electronic source documents 123, in accordance with one or more implementations. In some implementations, system 100 may include one or more servers 102, one or more client computing platforms 104, one or more user interfaces 128, one or more extraction engines 121, external resources 120, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a document component 108, an extraction component 110, a grid component 112, an input component 114, a presentation component 116, an action component 118, and/or other instruction components.

Document component 108 may be configured to obtain and/or retrieve documents, including but not limited to electronic documents, including scanned images, captured photographs, and/or other documents in electronic format. By way of non-limiting example, the electronic formats of the electronic documents may be one or more of Portable Document Format (PDF), Portable Network Graphics (PNG), Tagged Image File Format (TIF or TIFF), Joint Photographic Experts Group OPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source or a basis or a container for human-readable information. The electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth. The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. The electronic documents obtained by document component 108 may have a particular size and/or resolution.

Figure 3:
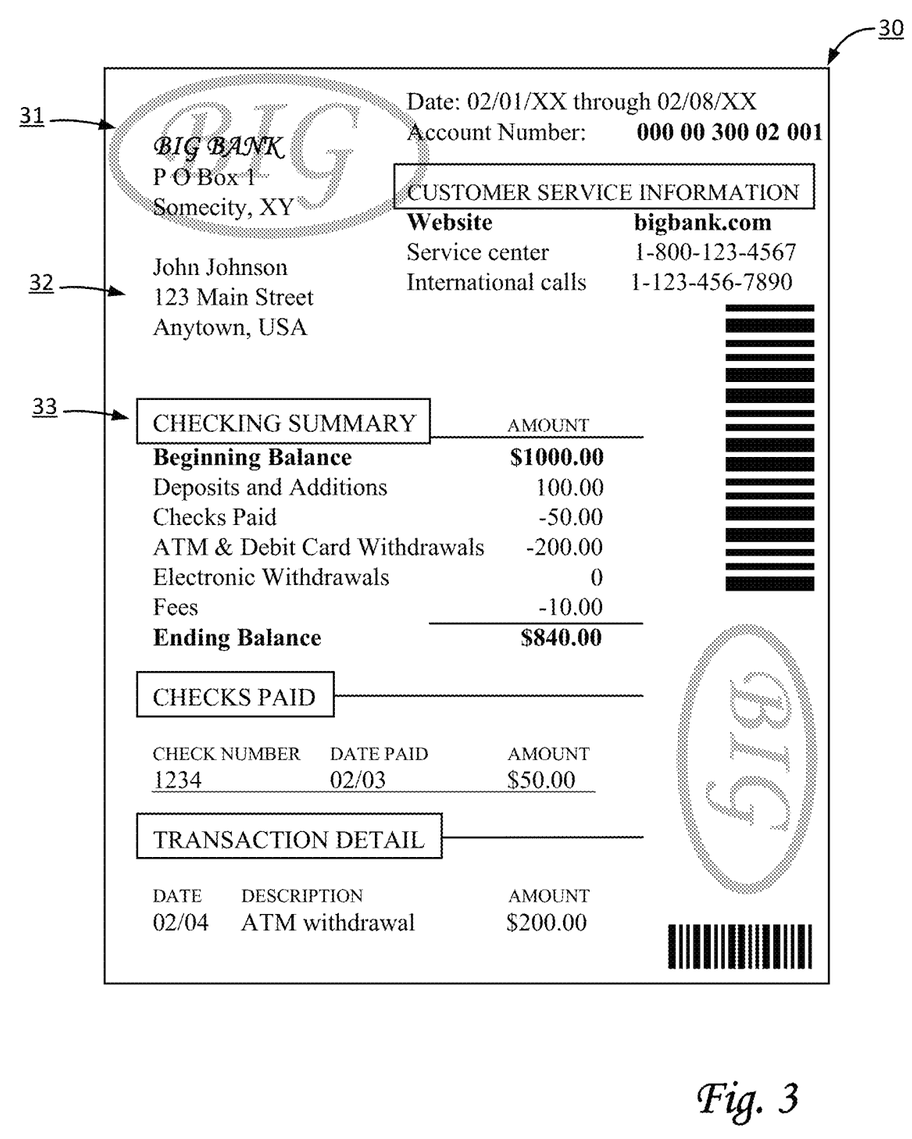
FIG. 3, FIG. 4A, FIG. 5, and FIG. 6 illustrate exemplary electronic documents as may be used in a system configured for spatial-aware information extraction from electronic source documents, in accordance with one or more implementations.

By way of non-limiting example, FIG. 3 illustrates an exemplary electronic source document 30 as may be used in system 100 (of FIG. 1), in accordance with one or more implementations. Exemplary electronic source document 30 may represent a bank statement from a particular bank, intended for a particular account holder, regarding a particular account of the particular account holder with the particular bank. The bank statement may include various familiar elements, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Figure 4A:
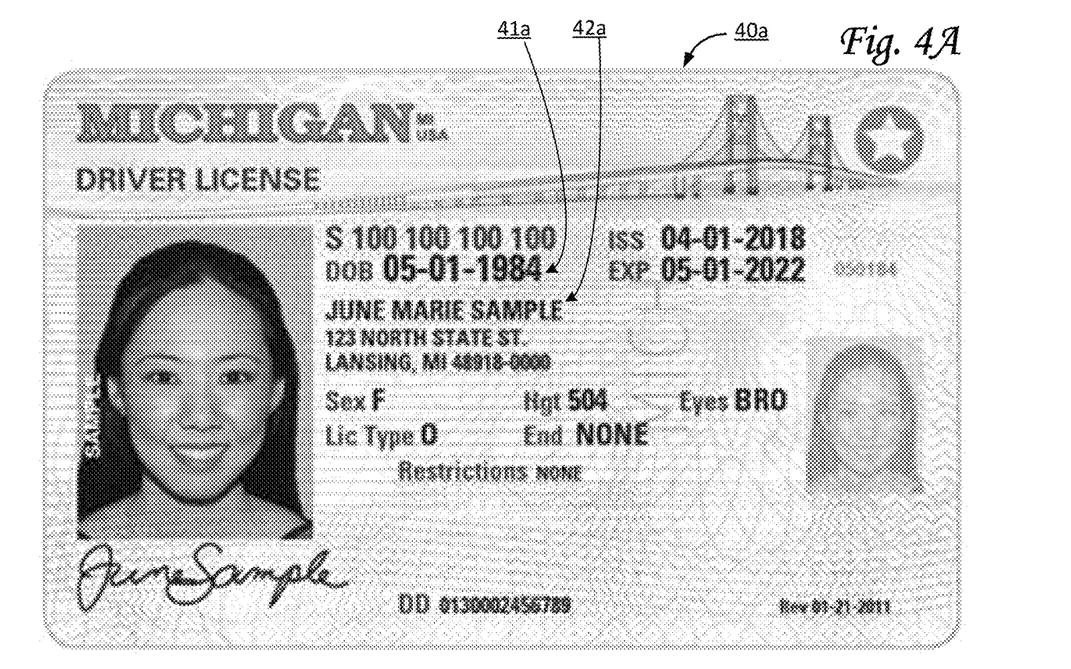

By way of non-limiting example, FIG. 4A illustrates an exemplary electronic source document 40a as may be used in system 100 (of FIG. 1), in accordance with one or more implementations. Exemplary electronic source document 40a may represent a driver license from a particular state. The driver license may include various familiar elements, such as, by way of non-limiting example, the driver's date of birth ("DOB") as indicated by a first group of characters 41a, the driver's name and address as indicated by second group of characters 42a, and other familiar elements of a driver license.

Figure 5:
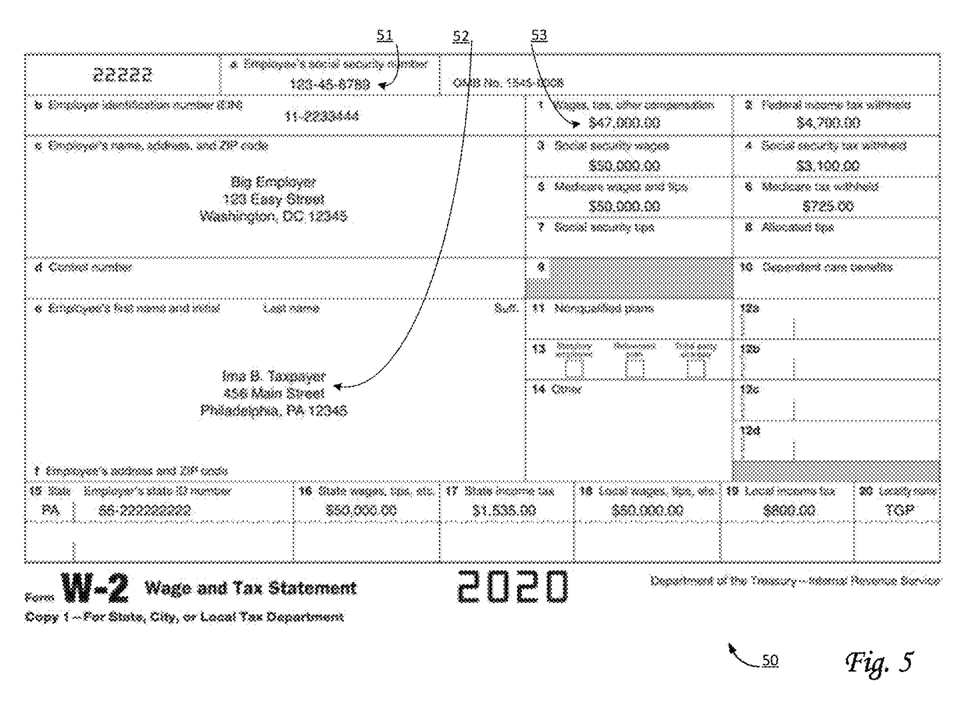

By way of non-limiting example, FIG. 5 illustrates an exemplary electronic source document 50 as may be used in system 100 (of FIG. 1), in accordance with one or more implementations. Exemplary electronic source document 50 may represent a W2 wage and tax statement. The W2 may include various familiar elements, such as, by way of non-limiting example, the person's social security number as indicated by a first group of characters 51, the person's name and address as indicated by second group of characters 52, the person's wages as indicated by third group of characters 53, and other familiar elements of a W2.

Figure 6:
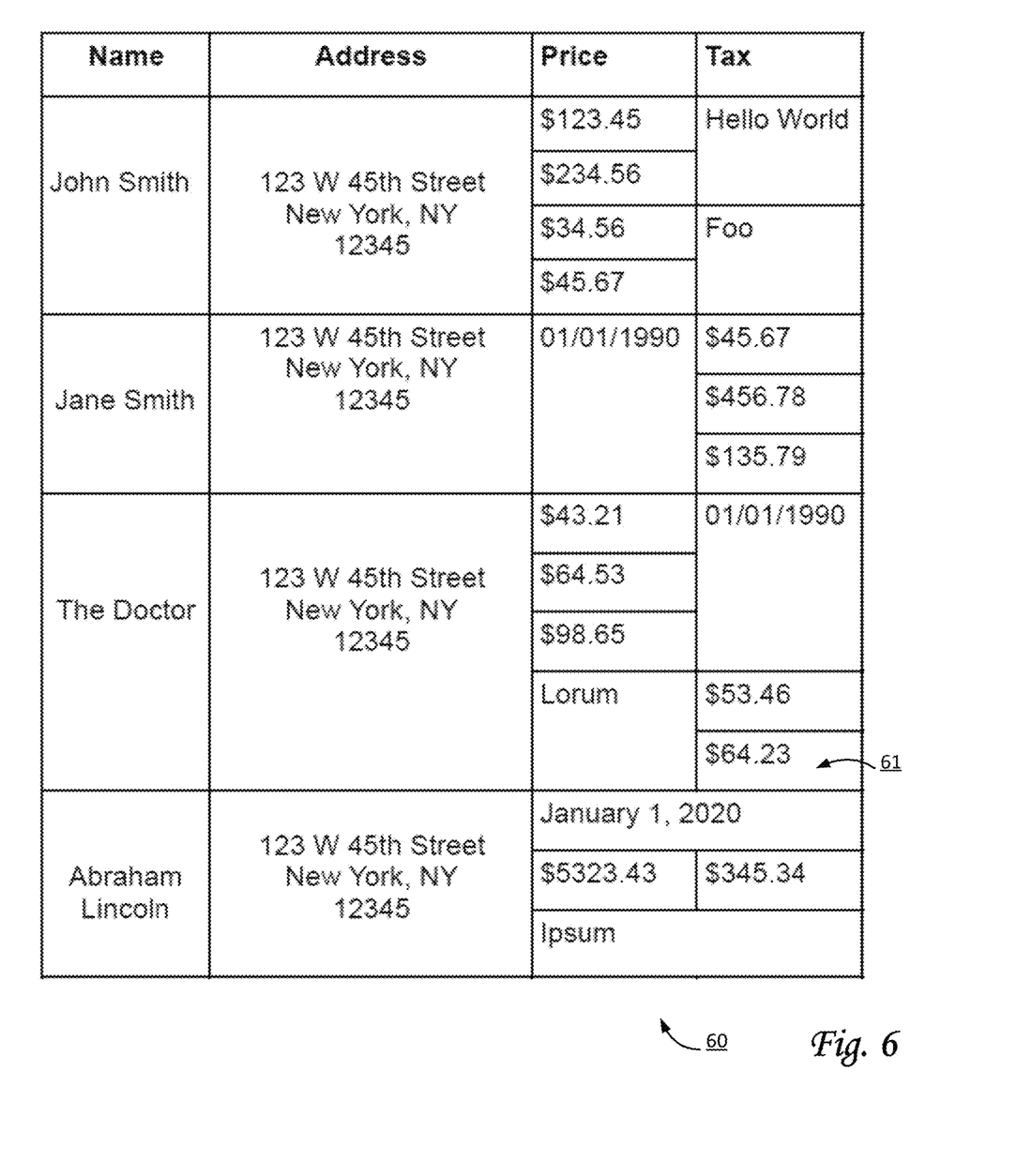

By way of non-limiting example, FIG. 6 illustrates (a portion of) an exemplary electronic source document 60 as may be used in system 100 (of FIG. 1), in accordance with one or more implementations. Exemplary electronic source document 60 may represent a table with information. The table may include various columns (labeled "Name", "Address", Price", and "Tax") and various rows.

Referring to FIG. 1, extraction component 110 may be configured to obtain, retrieve, produce, and/or generate extracted information 125 that has been extracted and/or otherwise derived from documents, including but not limited to electronic source documents 123. As used herein, the term "extract" and its variants refer to the process of identifying and/or interpreting information that is included in a document, whether performed by determining, measuring, calculating, computing, estimating, approximating, interpreting, generating, and/or otherwise deriving the information, and/or any combination thereof. In some implementations, the extracted information may have a semantic meaning, including but not limited to opinions, judgement, classification, and/or other meaning that may be attributed to human interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines 121. For example, a particular extraction engine 121 (referred to as an OCR engine) may use a document analysis process that includes optical character recognition (OCR). For example, a different extraction engine 121 (referred to as a line engine) may use a different document analysis process that includes line detection. For example, another extraction engine 121 (referred to as a signature engine) may use a particular document analysis process that includes detection of signatures. For example, another extraction engine 121 (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by extraction component 110. In some implementations, one or more of extraction engines 121 may be queried for a specific extraction, as specified by a user. For example, the line engine may be queried to return extracted information that matches the query: "the five longest line segments that are mostly vertical". For example, these line segments would be helpful in distinguishing between different columns in the table in FIG. 6.

In some implementations, extracted information 125 for a particular electronic source document 123 may include one or more sets of extracted characters. For example, these sets may include a first set of extracted characters, a second set of extracted characters, a third set of extracted characters, a fourth set of extracted characters, and so forth. The first set of extracted characters may correspond to a first group of characters in the human-readable information for particular electronic source document 123, the second set of extracted characters may correspond to a second group of characters in the human-readable information for particular electronic source document 123, and so forth. By way of non-limiting example, these sets of extracted characters may represent names, dates, numbers, strings, addresses, and/or other information. In some implementations, extracted information 125 may include meta-information regarding individual ones of the extracted characters or regarding sets of extracted characters. By way of non-limiting example, the meta-information may include one or more of font type, font size, font weight, font color, typographical emphasis (e.g., italic, bold, etc.), letter case, capitalization, margins, alignment, spacing, and/or other meta-information. In some implementations, the meta-information may further include indications of levels of confidence in the reliability of the document analysis process used to extract particular extracted information. For example, the meta-information may include an indication of the level of confidence (as determined by the document analysis process itself) in the accuracy of the results. For example, the meta-information may include an indication of reliability (as determined by the document analysis process itself) of the results. For example, the meta-information may include an indication of the level of accuracy (as determined by the document analysis process itself) of the results. In some implementations, the meta-information may represent a level of confidence of a machine-learning technique and/or rule-based technique used in a particular document analysis process. In some implementations, the meta-information of an item of extracted information may represent a sentiment attributed to some or all of the particular electronic source document. In some implementations, one or more of these indications may be represented by low, medium, or high levels. In some implementations, one or more of these indications may be represented, from low to high, by red, yellow, or green levels. In some implementations, one or more of these indications may be represented by numerical values between, say, 0 and 100, with 100 being the highest level (of confidence, reliability, accuracy, and/or other quality indications).

In some implementations, extracted information 125 may include one or more types of spatial information. For example, particular spatial information may correspond to a particular extracted character or set of extracted characters (and may be referred to as spatial character information or grid-specific spatial information, such as, e.g., textual coordinates). In some implementations, spatial information may include spatial coordinates that indicate spatial positions within particular electronic source document 123 (these may also be referred to as original spatial coordinates since these as associated with the original electronic documents). For example, in some implementations, the range for (original) spatial coordinates may be based on the resolution of a particular electronic source document 123. Both the horizontal resolution and the vertical resolution may vary from 100s to 1000s of pixels, in many cases not exceeding 3840 by 2160 pixels (also referred to as "4K-UHD" resolution). Accordingly, in such a case, spatial coordinates may range from (0,0) to (3840, 2160), or perhaps more accurately to (3839, 2159). For example, if a letter-sized document were scanned at 300 pixels-per-inch, its resolution would be 2550 by 3300 pixels. In some cases, high-resolution scanners can scan an A4 document at 6400 by 9600 pixels, which is probably more than needed to extract characters and/or other information. A set of two spatial coordinates, such as (x1, y1) and (x2, y2), may be used to define a rectangular area in particular electronic source document 123, e.g., around an individual character or corresponding to a set of extracted characters. Such an area may be referred to as a bounding box. Bounding boxes may also be detected and/or defined around other objects such as signatures, photographs, etc. In some implementations, obtaining the extracted information by extraction component 110 may include obtaining corresponding spatial information for one or more electronic source documents 123. In some implementations, spatial information may be generated by one or more extraction engines 121. For example, an OCR engine may extract and/or detect characters and provide spatial information specific to individual ones of the extracted characters or to sets of extracted characters.

In some implementations, extracted information 125 for a particular electronic source document 123 may include one or more sets of line segments and corresponding spatial line information. In some implementations, one or more line segments may be substantially horizontal on particular electronic source document 123. As used herein, the term "horizontal" when used in the context of electronic source documents may include not only items at a zero degree angle, but also items at an angle within a particular range, such as (−10°, 10°), (−5°, 5°), (−3°, 3°), (−1°, 1°), and/or other ranges of degrees. As used herein, the term "vertical" when used in the context of electronic source documents may include not only items at a 90 degree angle, but also items at an angle within a particular range, such as (80°, 100°), (85°, 95°), (87°, 93°), (89°, 91°), and/or other ranges of degrees. By way of non-limiting example, the line segments between the columns of the table in FIG. 6 are substantially vertical line segments, and the line segments between the five main rows on the left-hand side of the table in FIG. 6 are substantially horizontal line segments. In some implementations, corresponding spatial line information may include spatial information that corresponds to a particular line segment. In some implementations, this spatial information may include spatial coordinates that indicate spatial positions within particular electronic source document 123. For example, two spatial coordinates (e.g., (x1, y1)) may indicate an end-point of a line segment. For example, a set of two spatial coordinates, such as (x1, y1) and (x2, y2), may be used to define a rectangular area (a.k.a. a bounding box) in particular electronic source document 123, e.g., around an individual line segment.

Figure 4B:
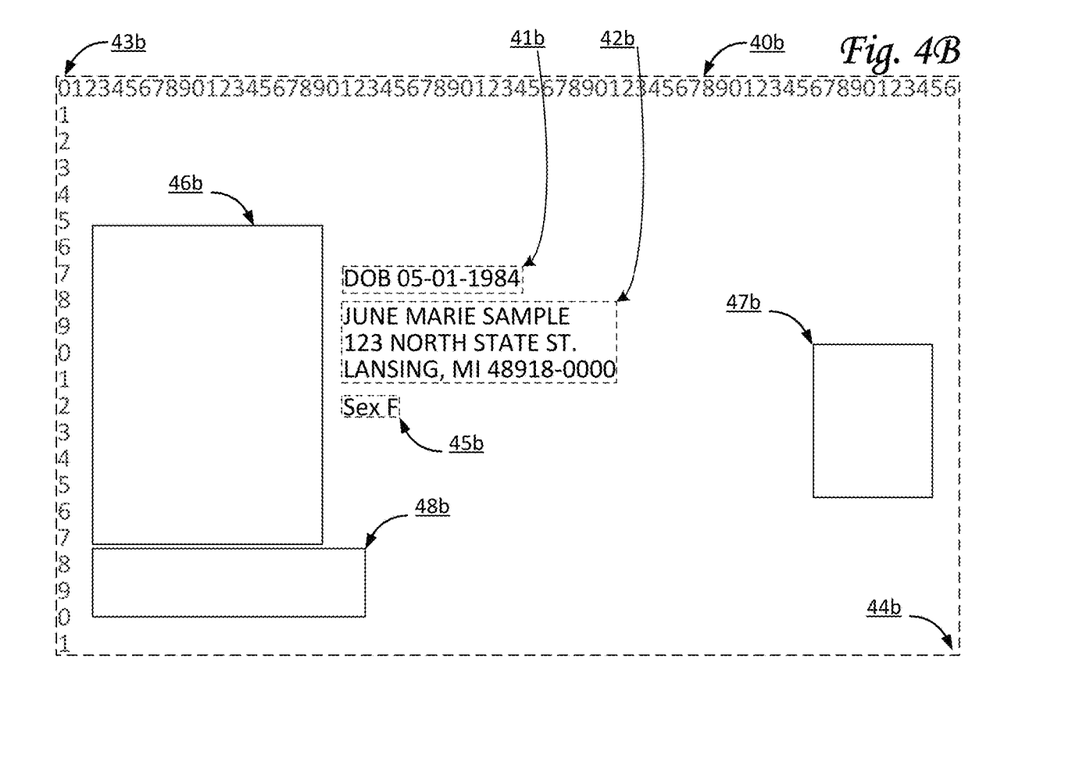
FIG. 4B illustrates an exemplary character-based representation as may be used in a system configured for spatial-aware information extraction from electronic source documents, in accordance with one or more implementations.

Referring to FIG. 1, grid component 112 may be configured to generate, create, and/or otherwise determine character-based representations of electronic source documents 123. The character-based representations may include sets of extracted characters (which may be associated with corresponding spatial coordinates). For example, grid component 112 may generate a character-based representation of a particular electronic source document 123 based on extracted information that has been extracted (or is otherwise correspond to) particular electronic source document 123. In some implementations, a character-based representation may use and/or otherwise include a grid of positions, including but not limited to character positions. In some implementations, this grid may be referred to as a character-grid or a grid of character-positions, for clarity. By way of non-limiting example, FIG. 4B illustrates an exemplary character-based representation 40b as may be used in system 100 (of FIG. 1). Character-based representation 40b may have been generated (by grid component 112) of electronic source document 40a (of FIG. 4A), and may be based on extracted information (e.g., obtained by extraction component 110 of FIG. 1) that has been extracted from electronic source document 40a. Character-based representation 40b may use a grid of character positions starting at origin coordinate 43b (the x-y coordinates of this origin are (0,0)), and extending to the bottom right corner 44b of character-based representation 40b, having x-y coordinates of (66,21) as depicted in FIG. 4B. Character-based representations may include sets of extracted characters. The sets of extracted characters may be positioned within the grid of character positions of a particular character-based representation.

Character-based representations may be generated such that relative positionings are maintained between a particular electronic source document 123 and its corresponding character-based representation. For example, assume particular electronic source document 123 includes a first, second, third, and fourth group of characters in the human-readable information of particular electronic source document 123 (each of these groups may have corresponding spatial coordinates in particular electronic source document 123). Assume a particular character-based representation of particular electronic source document 123 includes a first, second, third, and fourth set of extracted characters positioned in the grid of character positions of the particular character-based representation. Assume the first, second, third, and fourth set of extracted characters each have corresponding extracted spatial information (or grid-specific spatial information), e.g., a first, second, third, and fourth set of textual coordinates in the grid. A relative positioning between the first and second group of characters in particular electronic source document 123 may correspond to the relative positioning between the first and second set of extracted characters in the particular character-based representation. For example, if the first group of characters is directly above the second group of characters, maintaining relative positionings may mean that the first set of extracted characters is directly above the second set of extracted characters. For example, if the first group of characters is positioned to the left of the third group of characters, maintaining relative positionings may mean that the first set of extracted characters is positioned to the left of the third set of extracted characters. For example, if the first group of characters is positioned to the left and above the fourth group of characters, maintaining relative positionings may mean that the first set of extracted characters is positioned to the left and above the fourth set of extracted characters. In other words, the relative positioning between groups of characters in particular electronic source document 123 may correspond to the relative positioning between sets of extracted characters in the particular character-based representation.

By way of non-limiting example, FIG. 4B (in comparison with FIG. 4A) illustrates relative positioning. For example, a first set of extracted characters 41b (here, "DOB 05-01-1984") corresponds to first group of characters 41a in FIG. 4A. For example, a second set of extracted characters 42b (here, having three lines, the first line being "JUNE MARIE SAMPLE") corresponds to second group of characters 42a in FIG. 4A. In the relative positioning in FIG. 4A, first group of characters 41a is directly above second group of characters 42a. In the corresponding relative positioning in FIG. 4B, first set of extracted characters 41b is directly above second set of extracted characters 42b, thus maintaining the relative positioning between FIG. 4A and FIG. 4B. Grid component 112 may determine bounding boxes around first set of extracted characters 41b and second set of extracted characters 42b, both in textual coordinates (for character-based representation 40b in FIG. 4B) and spatial coordinates (for electronic source document 40a in FIG. 4A). Character-based representation 40b further includes bounding boxes 46b and 47b that correspond to photographs in electronic source document 40a. Character-based representation 40b further includes bounding box 48b that corresponds to a signature in electronic source document 40a. Character-based representation 40b further includes a set of extracted characters 45b that corresponds to a group of characters in electronic source document 40a.

Referring to FIG. 1, in some implementations, grid component 112 may be configured to generate, construct, and/or maintain a mapping between electronic source documents 123 and their corresponding character-based representations. In particular, such a mapping may be used to transition back and forth between spatial coordinates (in electronic source documents 123) and textual coordinates (in the corresponding character-based representations). In some implementations, operations using spatial coordinates are referred to as operating in "image-space", whereas operations using textual coordinates are referred to as operating in "text-space" or "text-view". Grid component 112 may generate, construct, and/or maintain spatial information (e.g., coordinates) for bounding boxes in electronic source documents 123 and their corresponding character-based representations (e.g., original spatial coordinates and textual coordinates, respectively).

Referring to FIG. 1, presentation component 116 may be configured to generate, effectuate, and/or present user interfaces 128 on client computing platforms 104 to users 127. For example, interface component 112 may be configured to present a particular user interface 128 on a particular client computing platform 104 to a particular user. For example, particular user interface 128 may include one or more portions or sections. In some implementations, presentation component 116 may be configured to present one or more graphical user interface elements on one or more user interfaces 128, e.g., responsive to a selection by a user (e.g., through user input received by input component 114). User interfaces 128 may be configured to enable users 127 to perform certain operations and/or actions pertaining to electronic source documents 123 and/or corresponding character-based representations. For example, operations may include searching for particular information and/or other content, selecting and/or cropping portions of electronic source documents 123 and/or corresponding character-based representations, as well as combinations of filtering, detecting, searching, selecting, cropping, transforming, converting, and/or other operations. For example, specific user input may enable a user to perform a search and/or a selection of information in a particular electronic source document 123 based on the corresponding character-based representation. For example, such a search may be for a name, address, date of birth, and/or other specific information. This may be a simple text-based search in a character-based representation. The result may include not only textual elements, but also spatial information, such as spatial coordinates and/or textual coordinates. Subsequent user input (e.g., a subsequent search) may be based on these results, including being based on the included spatial information. For example, the text to the right of "DOB" in FIG. 4B may represent the date of birth for a particular driver license holder. Likewise, referring to FIG. 4B, certain user input may find and/or select the spatial information (e.g., two bounding boxes) for two sets of extracted characters that start with "DOB" and "Sex", respectively, (here, set of extracted characters 41b and set of extracted characters 45b). Additionally, certain user input may select and crop the sets of extracted characters between these two bounding boxes, and return those set(s) of extracted characters (here, this cropped area includes three sets or lines, the first line being "JUNE MARIE SAMPLE"). Through combinations of specific user input (representing specific operations and/or actions pertaining to electronic source documents 123 and/or corresponding character-based representations), a user may not only extract particular information (say, an address) from one document (say, a first driver license from a particular state), but rather may have a template to extract similar particular information from a set of similar documents (say, driver licenses from the same particular state, or at least the ones using a similar design as the first driver license).

Referring to FIG. 1, input component 114 may be configured to receive user input from users 127, e.g., through user interfaces 128. In some implementations, particular user input may represent a search or a filter by a particular user for particular information (e.g., a text search may be based on a regular expression). In some implementations, particular user input may represent a selection (e.g., through a cropping operation) by a particular user of particular presented information. User input may direct system 100 (e.g., presentation component 116, action component 118, and/or grid component 112) to perform certain operations and/or actions pertaining to electronic source documents 123 and/or corresponding character-based representations. In some implementations, user input may represent and/or define combinations of filtering, detecting, searching, selecting, cropping, transforming, converting, and/or other operations on electronic source documents 123 and/or corresponding character-based representations.

Referring to FIG. 1, action component 118 may be configured to perform operations and/or actions pertaining to electronic source documents 123 and/or corresponding character-based representations. In some implementations, action component 118 may search and/or select particular information in a particular electronic source document 123. In some implementations, action component 118 may search and/or select particular information in a particular electronic source document 123 based on the character-based representation that corresponds to particular electronic source document 123. In some implementations, action component 118 may crop portions of electronic source documents 123 and/or corresponding character-based representations. In some implementations, action component 118 may perform combinations of filtering, detecting, searching, selecting, cropping, transforming, converting, and/or other operations on electronic source documents 123 and/or corresponding character-based representations. Operations and/or actions performed by action component 118 may be based on (and/or controlled by) user input from a user, including but not; limited to user input received by input component 114.

By way of non-limiting example, and referring to electronic source document 50 in FIG. 5, extraction component 110 may obtain extracted information that has been extracted from electronic source document 50, which may include sets of extracted characters and corresponding spatial information (both original spatial coordinates and textual coordinates). Grid component 112 may generate a character-based representation (not depicted) of electronic source document 50 such that particular relative positionings of groups of characters in electronic source document 50 correspond to relative positionings of sets of extracted characters in the generated character-based representation. Based on user input, and using a particular mapping that allows transitions back and forth between image-space and text-space, a combination of one or more of filtering, detecting, searching, selecting, cropping, transforming, converting, and/or other operations may be performed on electronic source document 50 and the generated character-based representation. The resulting information of performing these operations may be presented to a user, stored for future usage, and/or transferred to one or more client computing platforms 104 as needed. For example, in this case, the resulting information may be the grouping of a tax payer's name, social security number, and year-specific wages (this extracted information may correspond to second group of characters 52, first group of characters 51, and third group of characters 53 in electronic source document 50, respectively).

By way of non-limiting example, and referring to the table in electronic source document 60 in FIG. 6, extraction component 110 may obtain extracted information that has been extracted from electronic source document 60, which may include sets of extracted characters and corresponding spatial information (both original spatial coordinates and textual coordinates), as well as sets of line segments with spatial information. Grid component 112 may generate a character-based representation (not depicted) of electronic source document 60 such that particular relative positionings of groups of characters in electronic source document 60 correspond to relative positionings of sets of extracted characters in the generated character-based representation. Based on user input, and using a particular mapping that allows transitions back and forth between image-space and text-space, a combination of one or more of filtering, detecting, searching, selecting, cropping, transforming, converting, and/or other operations may be performed on electronic source document 60 and the generated character-based representation. The resulting information of performing these operations may be presented to a user, stored for future usage, and/or transferred to one or more client computing platforms 104 as needed. For example, in this case, the resulting information may be a portion 61 of contents from a particular column and a particular row, representing the amount of taxes paid in the bottom row corresponding to the name "The Doctor" (here, $64.23).

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., document component 108) may obtain documents. In some implementations, external resources 120 may include a provider of information, including but not limited to extracted information 125, from which system 100 and/or its components (e.g., extraction component 110) may obtain information and/or documents. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination.

Processor(s) 124 may be configured to execute components 108, 110, 112, 114, 116, and/or 118, and/or other components. Processor(s) 124 may be configured to execute components 108, 110, 112, 114, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 124 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 124 may be configured to execute one or more additional components that may perform some or all of the functionality attributed below to one of components 108, 110, 112, 114, 116, and/or 118.

Figure 2:
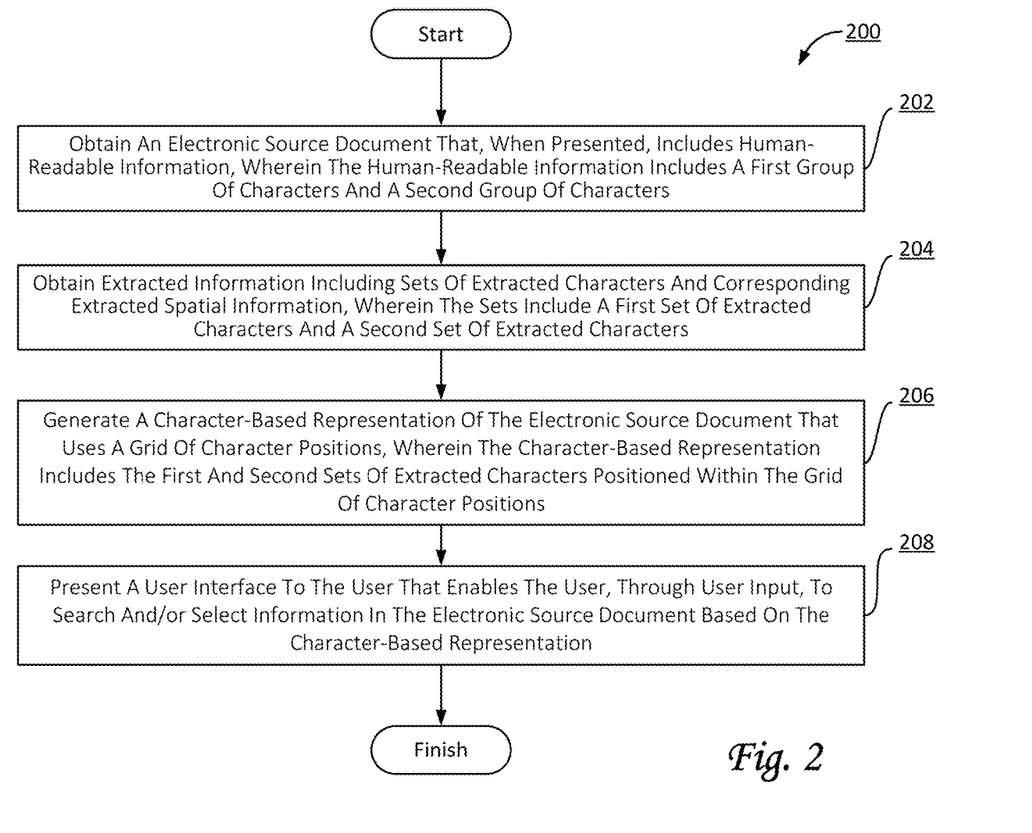
FIG. 2 illustrates a method for spatial-aware information extraction from electronic source documents, in accordance with one or more implementations.

FIG. 2 illustrates a method 200 for spatial-aware information extraction from electronic source documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining an electronic source document in electronic format. The electronic format may be such that, upon presentation of the electronic source document through a user interface associated with a client computing platform, the presentation includes human-readable information. The human-readable information includes a first group of characters and a second group of characters. Operation 202 may be performed by one or more hardware processors configured by machine-readable instructions including a component that is the same as or similar to document component 108, in accordance with one or more implementations.

An operation 204 may include obtaining extracted information that has been extracted or derived from the electronic source document. The extracted information may include sets of extracted characters and corresponding extracted spatial (character) information. The sets may include a first set of extracted characters and a second set of extracted characters. The first set of extracted characters may correspond to the first group of characters of the human-readable information. The second set of extracted characters may correspond to the second group of characters of the human-readable information. The extracted information may include sets of line segments and corresponding spatial line information. Operation 204 may be performed by one or more hardware processors configured by machine-readable instructions including a component that is the same as or similar to extraction component 110, in accordance with one or more implementations.

An operation 206 may include generating a character-based representation of the electronic source document based on the extracted information. The character-based representation may use and/or include a grid of character positions. The character-based representation may include the first set of extracted characters and the second set of extracted characters positioned within the grid of character positions. Operation 206 may be performed by one or more hardware processors configured by machine-readable instructions including a component that is the same as or similar to grid component 112, in accordance with one or more implementations.

An operation 208 may include presenting a user interface on the client computing platform to the user. The user interface enables the user, through user input, to search and/or select information in the electronic source document based on the character-based representation. Operation 208 may be performed by one or more hardware processors configured by machine-readable instructions including a component that is the same as or similar to presentation component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for spatial-aware information extraction from electronic source documents, the system comprising:
    one or more hardware processors configured by machine-readable instructions to:
        obtain an electronic source document in electronic format, wherein the electronic format is such that, upon presentation of the electronic source document through a user interface associated with a client computing platform, the presentation includes human-readable information, wherein the human-readable information includes a first group of characters and a second group of characters;

obtain extracted information that has been extracted or derived from the electronic source document, wherein the extracted information includes:
   (i) sets of extracted characters and corresponding extracted spatial information, wherein the sets include a first set of extracted characters and a second set of extracted characters, wherein the first set of extracted characters corresponds to the first group of characters in the human-readable information, and wherein the second set of extracted characters corresponds to the second group of characters of the human-readable information;
   (ii) sets of line segments and corresponding spatial line information;

generate a character-based representation of the electronic source document based on the extracted information, wherein the character-based representation uses a grid of character positions, wherein the character-based representation includes:
   the first set of extracted characters and the second set of extracted characters positioned within the grid of character positions, wherein a first relative positioning corresponds to a second relative positioning, wherein the first relative positioning is between (a) the first group of characters in the human-readable information and (b) the second group of characters in the human-readable information, and wherein the second relative positioning is between (c) the first set of extracted characters in the character-based representation and (d) the second set of extracted characters in the character-based representation; and present a user interface on the client computing platform to the user, wherein the user interface is configured to enable the user, through user input, to:
   (i) perform a search operation in a portion of the grid of character positions, and perform a cropping operation on the electronic source document based on a result of the search operation.

2. The system of claim 1, wherein the user interface is further configured to enable the user, through user input, to:
   (ii) crop a portion of the electronic source document based on the sets of line segments and corresponding spatial line information included in the extracted information; and
   (iii) generate a second character-based representation using a second grid of character-positions of the cropped portion; and
   (iv) search and/or select information in the cropped portion based on the second character-based representation.

3. The system of claim 1, wherein the electronic source documents include electronic files including scanned documents.

4. The system of claim 1, wherein the first group of characters in the human-readable information include one or more of words, numbers, names, and dates.

5. The system of claim 1, wherein the extracted information is obtained from an Optical Character Recognition (OCR) engine configured to extract the extracted information from the electronic source document, wherein the electronic source document is in Portable Document Format (PDF).

6. The system of claim 1, wherein the corresponding extracted spatial information for the first set of extracted characters includes a first set of spatial coordinates that indicate a first spatial position in the electronic source document, wherein the first set of extracted characters in the character-based representation is associated with a first set of textual coordinates in the grid of character positions, and wherein the first set of spatial coordinates corresponds to the first set of textual coordinates.

7. The system of claim 1, wherein the sets of line segments include at least one of a horizontal line segment and a vertical line segment.

8. The system of claim 1, wherein the user interface is configured to enable the user, through the user input, to perform two or more search operations in a portion of the grid of character positions, and perform a cropping operation on the electronic source document, wherein the cropping operation is based on results of the two or more search operations.

9. The system of claim 1, wherein the user interface is configured to enable the user, through the user input, to:
   (i) perform a combination of search operations, wherein at least a first search operation is performed in a portion of the grid of character positions, and wherein at least a second search operation is performed based on the sets of line segments and corresponding spatial line information included in the extracted information; and
   (ii) perform a cropping operation on the electronic source document, wherein the cropping operation is based on results of the combination of search operations.

10. A method for spatial-aware information extraction from electronic source documents, the method comprising:
   obtaining an electronic source document in electronic format, wherein the electronic format is such that, upon presentation of the electronic source document through a user interface associated with a client computing platform, the presentation includes human-readable information, wherein the human-readable information includes a first group of characters and a second group of characters;
   obtaining extracted information that has been extracted or derived from the electronic source document, wherein the extracted information includes:
      (i) sets of extracted characters and corresponding extracted spatial information, wherein the sets include a first set of extracted characters and a second set of extracted characters, wherein the first set of extracted characters corresponds to the first group of characters of the human-readable information, and wherein the second set of extracted characters corresponds to the second group of characters of the human-readable information;
      (ii) sets of line segments and corresponding spatial line information;
   generating a character-based representation of the electronic source document based on the extracted information, wherein the character-based representation uses a grid of character positions, wherein the character-based representation includes:
      the first set of extracted characters and the second set of extracted characters positioned within the grid of character positions, wherein a first relative positioning corresponds to a second relative positioning, wherein the first relative positioning is between (a) the first group of characters in the human-readable information and (b) the second group of characters in the human-readable information, and wherein the second relative positioning is between (c) the first set of extracted characters in the character-based representation and (d) the second set of extracted characters in the character-based representation; and presenting a user interface on the client computing platform to the user, wherein the user interface enables the user, through user input, to:
(i) perform a search operation in a portion of the grid of character positions, and perform a cropping operation on the electronic source document based on a result of the search operation.

11. The method of claim 10, wherein the user interface further enables the user, through user input, to:
(ii) crop a portion of the electronic source document based on the sets of line segments and corresponding spatial line information included in the extracted information; and
(iii) generate a second character-based representation using a second grid of character-positions of the cropped portion; and
(iv) search and/or select information in the cropped portion based on the second character-based representation.

12. The method of claim 10, wherein the electronic source documents include electronic files including scanned documents.

13. The method of claim 10, wherein the first group of characters in the human-readable information include one or more of words, numbers, names, and dates.

14. The method of claim 10, wherein the extracted information is obtained from an Optical Character Recognition (OCR) engine that extracts the extracted information from the electronic source document, wherein the electronic source document is in Portable Document Format (PDF).

15. The method of claim 10, wherein the corresponding extracted spatial information for the first set of extracted characters includes a first set of spatial coordinates that indicate a first spatial position in the electronic source document, wherein the first set of extracted characters in the character-based representation is associated with a first set of textual coordinates in the grid of character positions, and wherein the first set of spatial coordinates corresponds to the first set of textual coordinates.

16. The method of claim 10, wherein the sets of line segments include at least one of a horizontal line segment and a vertical line segment.

17. The method of claim 10, wherein the user interface enables the user, through the user input, to perform two or more search operations in a portion of the grid of character positions, and perform a cropping operation on the electronic source document, wherein the cropping operation is based on results of the two or more search operations.

18. The method of claim 10, wherein the user interface enables the user, through the user input, to:
(i) perform a combination of search operations, wherein at least a first search operation is performed in a portion of the grid of character positions, and wherein at least a second search operation is performed based on the sets of line segments and corresponding spatial line information included in the extracted information; and
(ii) perform a cropping operation on the electronic source document, wherein the cropping operation is based on results of the combination of search operations.

* * * * *